3,365,439
TITANIA/CHROMIUM OXIDE CATALYST AND
POLYMERIZATION PROCESS
Geir Bjornson, Bartlesville, Okla., assignor to Phillips
Petroleum Company, a corporation of Delaware
No Drawing. Filed May 11, 1964, Ser. No. 366,642
9 Claims. (Cl. 260—94.9)

This invention relates to a chromium oxide/titanium oxide catalyst. In a further aspect, the invention relates to a polymerization process using said catalyst.

A number of solid inorganic catalysts have been proposed for the polymerization of olefins to solid polymers at low pressures of 1000 p.s.i.g. and lower. The present invention provides a new catalyst for use in such systems.

The following are objects of this invention. One object is to provide a process for polymerizing olefin with novel catalysts. A further object is to provide novel catalysts for olefin polymerization. A further object is a novel method of preparing such catalysts. Other objects of the invention will become apparent from a consideration of this disclosure.

The catalyst composite of the present invention is prepared by impregnation, coprecipitation and the like. However, the impregnation technique wherein a solution of chromium oxide, or a chromium compound which yields the oxide on calcination, is contacted with particulate titania followed by drying to remove the solvent sometimes is preferred for ease of operation. For example, an aqueous solution of chromium trioxide or chromium nitrate is slurried with a finely divided titania such as Godfrey L. Cabot P-25 (a preferred finely divided crystalline titania which is nonporous and has a relatively low surface area) and the wet composite is then dried to remove the bulk water. Alkali metal chromates can also be used. The impregnated catalyst may be pressed into shapes such as pills, cylinders, saddles, and the like, if desired, or it may be utilized in the particulate condition which is suitable for suspended catalyst polymerizations. Impregnation sometimes causes caking after drying and the caked material may be crushed to any size desired. Particles from about 10 to about 200 mesh are convenient. Generally preferred are catalysts containing 0.001 to 10 weight percent chromium (calculated as the metal).

The nonporous titania should have a surface area of 10 to 250 square meters per gram for best results.

The catalyst can be activated at elevated temperatures prior to use. Exposure to temperatures of about 600 to about 1600° F. for periods of about 0.1 to about 50 hours are necessary. The activation is carried out in the presence of an oxygen containing gas such as air. The oxygen content of the gas is not critical. The activation is conveniently carried out under fluidized conditions whereby the particulate material is exposed to a flowing stream of dry air in an apparatus such as a heated tube. This treatment insures that at least part of the chromium is in the hexavalent state.

After the air activation, the catalyst is treated with carbon monoxide in a manner similar to the air activation. This CO treatment is carried out at 400 to 900° F. for 1 to 100 minutes. After this treatment, the catalyst can be cooled and stored before use in an inert atmosphere, such as nitrogen, and particularly protected from contact with water vapor.

The catalyst and process of this invention are utilized in the polymerization of $C_2$ to $C_8$ 1-olefins and conjugated diolefins to useful liquid, solid, and rubbery polymers. Some examples are ethylene, propylene, 1-butene, 1-pentene, 4-methyl-1-pentene, 1-hexene, 1-octene, butadiene, isoprene, piperylene, 1,3-octadiene, and the like. Copolymers of two or more of the above mentioned polymerizable materials can also be prepared.

When applied to the polymerization of ethylene, the invention catalyst and process results in the production of a solid polymer useful for the fabrication of rigid objects by molding or extrusion. Applied to conjugated diolefins such as butadiene and isoprene, the invention provides a method of making rubbery polymers.

Of particular interest is the rubbery polymer of isoprene prepared by this method. The hot xylene soluble portion (about 60 weight percent of the total polymer) is a soft white rubbery polymer which closely resembles natural rubber in processing. It is easily millable at low temperatures. It is a noncrystalline material having a microstructure consisting essentially of a combination of cis and trans 1,4-addition. The initially insoluble (crosslinked) portion of the raw polymer is easily solubilized by an oxidative treatment.

A sample of a polyisoprene obtained by this invention was extracted with hot xylene. The soluble portion of the polymer was examined by infrared absorption analysis in carbon disulfide solution to determine its microstructure. Trans-1,4-addition was measured by comparison with balata, the natural trans-isomer. The amount of 1,2-addition was measured at 11.0 microns using a calibration from polybutadiene. The 3,4-addition was measured at 11.25 microns, assuming the same absorptivity as for the 1,2-addition, and correcting for an absorption band present in balata but not due to 3,4-addition. The cis-1,4-addition was determined by difference. The results showed the following microstructure:

| | Percent |
|---|---|
| Trans-1,4-addition | 70 |
| Cis-1,4-addition | 28 |
| 3,4-addition | 1.6 |
| 1,2-addition | 0.1 |

A side reaction in the isoprene polymerization is the formation of low molecular weight liquid polymers such as octadienes and vinylcyclohexenes. Thus, in addition to the rubbery polymer, a small quantity of oil is formed which is easily separable and useful in drying oil formulations. The amount of oil produced increases with reaction temperature. The activated titania itself, without chromium oxide promotion, produces a small amount of oil with only a trace of rubbery polymer.

According to the polymerization process of this invention, the monomer charge and catalyst are contacted at a temperature of 0–400° F. and a pressure of 0–1000 p.s.i.g. The reaction time can range from 1 minute to 50 hours, preferably 0.5 to 10 hours. The process can be carried out in the presence or absence of a diluent. When a diluent is used, liquids such as cyclohexane or isooctane are suitable in amounts of 0.1–100 parts diluent per part polymerizable monomer by weight. Any conventional polymerization system such as a batch reactor, preferably equipped with means to agitate the contents, a continuous fixed catalyst bed system, or a continuous suspended catalyst system may be used. In whichever technique is used, the amount or rate of monomer addition depends to a significant degree upon the initial amount of catalyst charged or the addition rate of catalyst if the system is continuous. The amount of catalyst used depends upon the desired rate of polymer production and the capacity of the polymerization equipment particularly in regard to its ability to dissipate the heat of reaction. In general, the catalyst in the reaction zone is present in an amount from about 0.01 to about 20 weight percent of the monomer present.

After reaction, the polymerized material is recovered by removal of volatile material and drying. Residual catalyst can be removed, if desired, by simple filtration or settling after first dissolving the polymer in a suitable solvent such as hot cyclohexane. It is generally advisable to add preservatives such as antioxidants to the polymer soon after the polymer is recovered.

The invention is further illustrated by the following examples, which should not be considered unduly limiting.

EXAMPLE I

*Preparation of catalyst*

Titanium dioxide (Godfrey L. Cabot ultra-fine P-25 titania, a crystalline material having a particle diameter of about 330 A and a surface area of 45 m.²/g. was slurried with an aqueous solution of chromium nitrate at room temperature. The slurry was then dried in an oven at about 212° F. at reduced pressure. The dry material was crushed and screened. The particulate material passing through the 50 mesh (U.S. Series) screen and retained on the 100 mesh screen was subjected to the activation.

The particulate material, containing 0.57 weight percent Cr, was placed in a quartz activating tube and heated for 18 hours at 750° F. in the presence of flowing air. The catalyst was then treated in the same apparatus with a stream of CO containing gas (42 percent CO–58 percent $N_2$ by volume) for 17 minutes at about 750° F. The catalyst was then cooled and stored under nitrogen until used.

*Polymerization*

This catalyst was utilized to polymerize ethylene to solid polymer. A 0.0720 g. quantity of the catalyst was charged into a 1-liter polymerization reactor equipped with a stirrer together with 1 pound of polymerization grade cyclohexane. The reactor was sealed and ethylene was admitted to maintain a pressure of 485 p.s.i.g. The reaction was continued for 1 hour at 280° F. The reactor was then vented, and the polymer removed and dried. The calculated polymerization rate for the solid ethylene polymer in this system was 6 g. polymer/g. catalyst/hour.

EXAMPLE II

The catalyst of Example I was used for the polymerization of 1,3-butadiene and isoprene. For the butadiene run, 0.7559 gram of catalyst was used per pound of monomer. Rubbery polymer was produced at the rate of 6.9 g./g. catalyst/hour during a reaction time of 2.5 hours at 212° F. For the isoprene run, 2.1536 grams of catalyst were used per pound of monomer. Rubbery polymer was produced at the rate of 22.6 g./g. of catalyst/hour during a reaction time of 2 hours at 240° F.

EXAMPLE III

To illustrate the necessity of chromium addition, a quantity of the titania of Example I was activated by treating with air at 800° F. for 18 hours followed by contacting with a gas consisting of CO at 600° F. for 17 minutes. A 10.043 gram portion of this catalyst was mixed with isoprene and the mixture maintained at 240° F. for 1 hour. The product amounted to 0.21 gram of solid polymer and 0.95 gram of liquid polymer, a yield of 0.11 g./g. catalyst/hour.

As many possible embodiments can be made of this invention without departing from the scope thereof, it is to be understood that all matter herein set forth is to be interpreted as illustrative and not as unduly limiting the invention.

I claim:

1. A process which comprises polymerizing at least one aliphatic 1-olefin having from 2 to 8 carbon atoms per molecule or conjugated diolefins, at a polymerization temperature in the range of 0 to 400° F., with a catalyst active for such polymerization produced by contacting a material consisting essentially of chromium oxide and titanium oxide with an oxygen-containing gas at a temperature of 600–1600° F. for 0.1 to 50 hours followed by contacting said material with carbon monoxide at a temperature of 400 to 900° F. for 1 to 100 minutes, at least a portion of the chromium being in the hexavalent state immediately following contact with said oxygen-containing gas.

2. The process according to claim 1 wherein said olefin is ethylene.

3. The process according to claim 1 wherein said conjugated diolefin is 1,3-butadiene.

4. The process according to claim 1 wherein said olefin is isoprene.

5. A process which comprises polymerizing ethylene with a catalyst active for such polymerization produced by contacting a material consisting essentially of chromium oxide and titanium oxide with air at a temperature of 600 to 1600° F. for 0.1 to 50 hours followed by contact with carbon monoxide at a temperature of 400 to 900° F. for 1 to 100 minutes, at least a portion of the chromium being in the hexavalent state immediately following contact with said air, said polymerization being carried out at a temperature in the range of 0 to 400° F. in the presence of a diluent which is inert and liquid under the polymerization conditions.

6. A process which comprises polymerizing 1,3-butadiene with a catalyst active for such polymerization produced by contacting a material consisting essentially of chromium oxide and titanium oxide with air at a temperature of 600 to 1600° F. for 0.1 to 50 hours followed by contact with carbon monoxide at a temperature of 400 to 900° F. for 1 to 100 minutes, at least a portion of the chromium being in the hexavalent state immediately following contact with said air, said polymerization being carried out at a temperature in the range of 0 to 400° F. in the presence of a diluent which is inert and liquid under the polymerization conditions.

7. A process which comprises polymerizing isoprene with a catalyst active for such polymerization produced by contacting a material consisting essentially of chromium oxide and titanium oxide with air at a temperature of 600 to 1600° F. for 0.1 to 50 hours followed by contact with carbon monoxide at a temperature of 400 to 900° F. for 1 to 100 minutes, so that at least a portion of the chromium is in the hexavalent state immediately following contact with said air, said polymerization being carried out at a temperature in the range of 9 to 400° F. in the presence of a diluent which is inert and liquid under the polmerization conditions.

8. A catalyst produced by contacting a material consisting essentially of chromium oxide and titanium oxide with an oxygen-containing gas at a temperature of 600 to 1600° F. for 0.1 to 50 hours followed by contact with carbon monoxide at a temperature of 400 to 900° F. for 1 to 100 minutes, at least a portion of the chromium being in the hexavalent state immediately following contact with said oxygen-containing gas.

9. A process for activating a catalyst consisting essentially of chromium oxide and titanium oxide which comprises said catalyst with an oxygen-containing gas at 600 to 1600° F. for 0.1 to 50 hours followed by contact with carbon monoxide at 400 to 900° F. for 1 to 100 minutes, at least a portion of the chromium being in the hexavalent state immediately following contact with said oxygen-containing gas.

References Cited

UNITED STATES PATENTS

| | | | |
|---|---|---|---|
| 2,692,258 | 10/1954 | Roebuck | 260—94.9 |
| 2,825,721 | 3/1958 | Hogan | 260—94.9 |
| 3,010,948 | 11/1961 | Field | 260—94.9 |
| 3,166,537 | 1/1965 | Gregg | 260—94.9 |

JOSEPH L. SCHOFER, *Primary Examiner.*

F. L. DENSON, L. EDELMAN, *Assistant Examiners.*